United States Patent
Podgorny et al.

(10) Patent No.: US 10,997,254 B1
(45) Date of Patent: May 4, 2021

(54) 1307458USCON1 SEARCH ENGINE OPTIMIZATION IN SOCIAL QUESTION AND ANSWER SYSTEMS

(71) Applicant: INTUIT INC., Mountain View, CA (US)

(72) Inventors: Igor A. Podgorny, San Diego, CA (US); Todd Frey Goodyear, San Diego, CA (US); Bradly S. Feeley, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 207 days.

(21) Appl. No.: 16/016,252

(22) Filed: Jun. 22, 2018

Related U.S. Application Data (63) Continuation of application No. 14/025,470, filed on Sep. 12, 2013, now Pat. No. 10,031,970.

(51) Int. Cl.
G06F 3/00 (2006.01)
G06F 16/951 (2019.01)

(52) U.S. Cl.
CPC ................ *G06F 16/951* (2019.01)

(58) Field of Classification Search
CPC .. G06F 17/30867; G06F 17/28; G06F 3/0481; G04L 12/1813; H04L 12/2803
See application file for complete search history.

(56) References Cited

U.S. PATENT DOCUMENTS

| | | | |
|---|---|---|---|
| 6,028,601 A * | 2/2000 | Machiraju | G06F 40/211 715/705 |
| 8,392,360 B1 * | 3/2013 | Dicker | G06Q 10/10 707/608 |
| 8,930,191 B2 * | 1/2015 | Gruber | B60K 35/00 704/257 |
| 2009/0037421 A1 * | 2/2009 | Gamble | G06F 11/008 |
| 2009/0113312 A1 * | 4/2009 | Schoenberg | G06Q 10/10 715/753 |
| 2009/0300143 A1 * | 12/2009 | Musa | H04N 7/17318 709/218 |
| 2013/0047097 A1 * | 2/2013 | Stephens | G06Q 10/10 715/753 |
| 2013/0226846 A1 * | 8/2013 | Li | G06N 20/00 706/12 |
| 2014/0280087 A1 * | 9/2014 | Isensee | G06F 16/2455 707/723 |
| 2015/0039536 A1 * | 2/2015 | Cook | G06N 5/02 706/11 |

* cited by examiner

*Primary Examiner* — Anil N Kumar
(74) *Attorney, Agent, or Firm* — Patterson + Sheridan, LLP (57) ABSTRACT

Certain aspects of the present disclosure provide techniques for facilitating text inputs with long-tail keywords from a user in a social question and answer (Q&A) application. One example method generally includes receiving, at a server, a text input from the user at a client computer, and applying, a predictive model to the text input. The method further includes determining based on the predictive model, an increase in user traffic that is predicted to be generated from the text input and determining, a user interface (UI) to be generated for display to the user for subsequent interaction based on the increase in user traffic. The method further includes sending the UI to the client computer and receiving a subsequent text input from the client computer.

20 Claims, 6 Drawing Sheets

1307458USCON1 SEARCH ENGINE OPTIMIZATION IN SOCIAL QUESTION AND ANSWER SYSTEMS

CROSS-REFERENCE TO RELATED APPLICATIONS

This Application is a continuation of U.S. patent application Ser. No. 14/025,470, filed on Sep. 12, 2013, which is herein incorporated by reference in its entirety.

INTRODUCTION

The present disclosure generally relates to techniques for facilitating text inputs from users that are optimized for search engines within social question and answer systems. More specifically, the present disclosure relates to a technique for obtaining posts with long-tail keywords within social question and answer systems.

BRIEF SUMMARY

The described embodiments relate to techniques for facilitating text inputs with long-tail keywords from a user in a social question and answer (Q&A) application. During operation, the system receives an input from the user. The system then applies a predictive model to the received input to determine a predicted business outcome for the user. Next, the system renders a user interface (UI) for subsequent user interaction with the social Q&A application, based on the predicted business outcome. Finally, the system displays the rendered UI to the user.

In some embodiments, rendering the UI for subsequent user interaction with the Q&A application involves rendering a generic UI when the determined score is below a first predefined threshold.

In some embodiments, rendering the UI for subsequent user interaction with the Q&A application involves rendering a customized UI when the determined score is above a second predefined threshold.

In some embodiments, the customized UI facilitates subsequent simplified text input from the user, wherein the subsequent text input is directed to a community associated with the social Q&A application.

In some embodiments, applying the predictive model involves obtaining model attributes from one or more of: the content of the received input, data associated with the user, and data associated with the product.

In some embodiments, obtaining values for the model attributes from the content of the received input involves preprocessing the received input with a natural-language processing model, and generating a bag of words.

In some embodiments, the values for the model attributes from the data associated with the user are based on one or more of: a type of the user, a type of web browser, a type of operating system, and a location of the user.

In some embodiments, the values for the model attributes from the data associated with the product are based on one or more of: a type of product, a type of product flavor, and a type of platform.

In some embodiments, determining the business outcome for the received input involves determining one or more of: a number of potential search engine users who will click on a search engine snippet based on the received input and create an account, a number of potential search engine users who will click on a search engine snippet based on the received input, create an account, and convert to a specified product, and a net revenue associated with potential search engine referrals attributed to a post in the social Q&A application based on the received input.

Other embodiments provide a non-transitory computer-readable storage medium and a computer system that facilitate text inputs with long-tail keywords from a user in a social Q&A application in accordance with described embodiments.

BRIEF DESCRIPTION OF THE DRAWINGS

The appended figures depict certain aspects of the one or more embodiments and are therefore not to be considered limiting of the scope of this disclosure.

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored in a non-transitory computer-readable storage medium as described above. When a computer system reads and executes the code and/or data stored on the computer-readable storage medium, the computer system perform the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview of Social Question and Answer (Q&A) Applications

Widespread use of the Internet by a large and diverse population has led to several new applications that further tap into this population to obtain solutions to specific problems. Such applications exploit what is referred to as "crowdsourcing," i.e., using the wisdom of the crowd to perform a task, obtain an answer, or create content. Other commonly used terms include "crowd-voting," "crowd-funding," "micro-work," "crowd-wisdom," and "content-creating." As used in this application, the term crowdsourcing subsumes all of these alternative terms.

Crowdsourcing applications often take the form of social Q&A applications. In these applications, a user of the application typically posts a question to a forum or a community of other users. The other users will, in turn, respond with a variety of answers to the posted question. Often, such answers are further rated or are voted on by other users. The answers to the post may then be potentially ranked and displayed along with the posted question.

An example is the TurboTax® Live Community (TTLC). This is a social Q&A application in which TurboTax® customers can learn tax-preparation solutions, and share these solutions with other TurboTax® Online (TTO) users. As users step through each TurboTax® application screen in the course of their tax preparation, they can view contextually relevant questions and answers, hereinafter referred to as posts, displayed on the screen. Furthermore, they can participate in the Live Community by posting questions, answering questions, providing comments, and voting on answers.

Overview of Search Engine Referrals to Social Q&A Websites

Often, social Q&A application websites on the Internet are regularly crawled and indexed by major search engines, such as Google®. As a result, user traffic is often directed by the search engines to these sites, resulting in extra revenue for the sites with no extra advertisement costs. Consequently, optimizing the content generation at these websites for search engine referrals can result in a multifold increase in the revenue stream generated from the resulting user traffic.

Typically, these websites often have large databases that contain commonly asked questions and corresponding answers. The databases may contain questions and answers that are provided by the application providers (such as may be found in frequently asked questions (FAQ) databases), and/or questions and answers presented, and possibly voted upon, by other users in the associated social Q&A community. Often, when a question is first posted to the community, the querying user is first redirected to the answers database. This redirection enables the user to view available answers that may be related to the question. It also reduces the number of duplicate questions getting directly posted online for viewing by other users. However, this redirection also reduces the number of posts generated by users in the community. In the course of navigating the typically large Q&A databases, a user may decide to not post the question online, or may decide to post the question later, and may then forget to post the question, or get otherwise distracted. Consequently, a question that may be relevant and especially suited for search engine crawling may not get posted, and this, in turn, reduces the potential revenue stream from search engine user traffic.

It is desirable for the social Q&A system to be selective with regards to redirecting users to available answers databases. This involves evaluating a received question from a user with a view either to redirecting the user to one or more answers databases or to generating an interface for the user which facilitates directly posting the question to other users within the Q&A community. The analysis may also result in generating one or more intermediate screens that take the user through a tailored navigation through the answers databases before enabling posting of the question to the community for answers.

A Zipf law distribution is often used to approximate keyword data generated in linguistic contexts. This law states that, given a corpus of natural-language utterances, the frequency of occurrence of any word is inversely proportional to its rank in the frequency table. A Zipf distribution is typically a long-tail distribution, i.e., a distribution in which a low-frequency population of keywords that tails off asymptotically follows a high frequency population of keywords. The keywords corresponding to the tail end of the distribution, i.e., the long-tail keywords, tend to be more unique words that have a lower probability of occurrence than the popular keywords that form the head of the distribution.

It is useful to think of long-tail keywords as corresponding to more uncommonly used words. They may correspond to words that refer to specific details that are of interest to the other users of the social Q&A community. In the context of an online community, it has been observed that posts with long-tail keywords result in getting tagged with higher search rankings by typical search engines such as Google®. Furthermore, in typical social Q&A databases, while there may be a large volume of questions and corresponding answers, only a small fraction of these tend to be active long-tail questions with high search engine rankings.

Thus, a current goal is to encourage posts that use long-tail keywords because these more uniquely worded posts have higher search ranking in the course of being crawled, indexed and summarized as a post snippet by a search engine. Thus, encouraging questions or posts by users with long-tail keywords will optimize search engine rankings for the posts, and consequently generate extra revenue streams from redirected search engine user traffic.

Additional goals include providing a data-driven user experience for each user type and segment, discouraging the submission of uninformed or duplicate questions, and encouraging participation within the Q&A community by targeted users. Such users may possess informed knowledge within the community, may contribute to the knowledge database within the community, may generate questions with long-tail keywords that are constructed to be search-engine friendly with high associated search-engine rankings, and may encourage crowdsourced long-tail content generation within the overall community.

Search Engine Optimization in Social Q&A Posts

The embodiments described herein provide a method and system to facilitate the entry of text inputs with long-tail keywords from a user in a social question and answer (Q&A) application. The social Q&A application may be associated with application software such as a word-processor, an email client, a web browser, a web application, and/or a tax preparation application. The application may be used to perform one or more tasks for a user of the application. For example, the application may allow the user to create documents, display web pages, and/or prepare tax forms. Furthermore, the user may interact with the application through the application's UI.

In some embodiments, a user first enters a question on the social Q&A application website using the UI initially provided for this purpose by the application. The system applies a predictive model to the entered question in order to predict a business outcome associated with the entered question. The predicted business outcome may, for example, be the revenue predicted as a result of the entered question. Based on the predicted business outcome, the system displays a subsequent UI to the user that is either a generic UI or a customized UI.

In some embodiments, when the predicted business outcome or value associated with the entered question is considered to have little or poor value, i.e., is below some predefined first threshold, a generic UI is displayed to the user. This may involve repeating the initial UI and/or displaying an instant answers page that merely facilitates navigation through the answers database of the application.

In some embodiments, the generic UI may explicitly exclude a way for the user to post their question to the social Q&A community forum. The generic UI merely permits the user to rephrase their initial question. This interface may remain unchanged as the user repeatedly rephrases the question. When the system repeatedly applying the predictive model to a rephrased question determines that the predicted business value of the rephrased question has improved above the predefined first threshold, then it may render a customized UI to the user.

In some embodiments, when it is determined that the predicted business value of a question has moderate value, i.e., that it is above the predefined first threshold but below a predefined second threshold, the system may render a UI that continues to display an instant answers portion that facilitates navigation through the answers database. However, in addition, the rendered UI may also display a way for the user to post the question to the forum. The rendered UI may selectively devote a larger or more visible portion of the display screen to either the instant answers portions or to facilitating direct posting of the question to the community based on the value of the predicted business value.

In some embodiments, facilitating direct posting of the question to the community may involve displaying a button that may be clicked by the user to post the question to the forum. In other embodiments, this may further include a pop-up window that allows the user to further edit and/or post the question.

In some embodiments, depending on the predicted business value of a question, there may be a sequence of navigation screens associated with the instant answers page associated with the answers database, before the user is provided with an opportunity to post the question to the Q&A community.

In some embodiments, when it is determined that the predicted business value of a question has high value, i.e., that it is above the predefined first and second thresholds, the system may directly render a customized UI that removes all barriers, such as required navigation through a sequence of pages/screens, and permits the user to directly post their question to the Q&A forum. The UI may provide a way for the user to provide more relevant details pertaining to their question.

The business objective in evaluating a question by a user is to predict the potential business outcome related to the question. This is done by applying a predictive model to identify, in real time, those Q&A community posts that have a high probability of generating extra revenue from search engine referrals, and exempting those questions from standard user flow in real time. Furthermore, the system facilitates posting such identified questions immediately to the Q&A community forums. The predictive model that is employed in some embodiments is trained on typical search engine referral data, such as Google® referral data, using a regularized regression model. The model attributes used for the predictive modeling analysis include the content of the post, the associated user and product data.

In some embodiments, applying the predictive model to a question entered by a user involves obtaining the values for attributes of the predictive model from the content of the entered question, from data associated with the user, and from data associated with the product from which the question is posted.

In some embodiments, in order to obtain the model attributes from the content associated with the posted question, a natural-language model may be first applied to perform preprocessing on the text. For the purposes of predictive modeling, the post content may be a text snippet that is shown by the search engine, as well as metadata associated with the text. The latter may involve details, such as whether the question is product related. Thus, for example, within a tax preparation software application, a relevant metadata may be that the question is tax-related. The choice of the metadata employed within the predictive model may be based on an analysis of typical search engine user behavior.

In some embodiments, the natural-language preprocessing of the text may involve employing natural-language models, such stemming, synonym extraction, named entity extraction, stop word removal, among others, and converting the text into an array using a bag-of-words model.

Thus, for example, consider the following question from a user: "Can I deduct my furniture in form 1099-DIV?" Based on the text content and the metadata associated with the post, this may be converted into an array of binary attributes of the form: "deduct"=1, "1099-DIV"=1, "tax"=0, "TurboTax"=0, etc. Note that, in this example, the absence of occurrence of predefined attributes may also represented, i.e., the attributes "tax" and "TurboTax" get a value of "0" since they are not expressed in the question from the user. In some embodiments, the size of the array of binary attributes may be based on a predefined percentage of most frequently used keywords associated with the Q&A application before or after stop word removal.

In some embodiments, the predictive model attributes obtained from data associated with the user may involve converting user data into numerical attributes. The user data set may involve a type of the user (i.e., a new user or a returning user), the user agent (i.e., type of web browser, type of operating system being used by the user), location of the user (i.e., state, ZIP code, etc.), and previous behavior of the user within the social Q&A community.

In some embodiments, the predictive model attributes obtained from data associated with the product may involve converting product data into numerical attributes. This may be used to distinguish among users who are entering questions using versions of the product that range from free to premium with multiple priced versions in between. In addition, the product data set may involve product flavor (i.e., personal or business), and product platform (i.e., desktop, web, mobile, etc.), among other attributes.

In some embodiments, in predicting the business outcome of a question from a user, the system balances the cost of crowdsourcing answers to a question that is exempt from the standard user flow through the answers database with the revenue that is generated from the search engines to the Q&A community posts. Typically, a threshold for exemption from the standard or generic UI may be the top 10% or 20% of the received questions. In some embodiments, the chosen thresholds for the selection of the UI that is displayed to the user subsequent to the question entry may be continually refined based on the newly updated data being generated at the Q&A community.

In some embodiments, determining the business outcome for the received input involves determining one or more of: a number of potential search engine users who will click on a search engine snippet based on the received input and create an account, a number of potential search engine users who will click on a search engine snippet based on the received input, create an account, and convert to a specified product, and a net revenue stream associated with potential search engine referrals attributed to a post in the social Q&A application based on the received input.

Thus, in applying the predictive model and predicting the business outcomes of questions entered by users, the system performs a real-time behavioral segmentation of users. This segmentation results in a selection of a "targeted user", i.e., a user who is identified in real time as one who generates long-tail questions with high search engine rankings. In some embodiments, users may be ranked by the quality and uniqueness of their text inputs.

In performing such search engine optimization for posts within the Q&A community, the system simplifies the question-asking flow for a targeted user in real time, and maximizes the generation of long-tail content with high search engine ranking within the Q&A database.

Computing Environment

Figure 1:
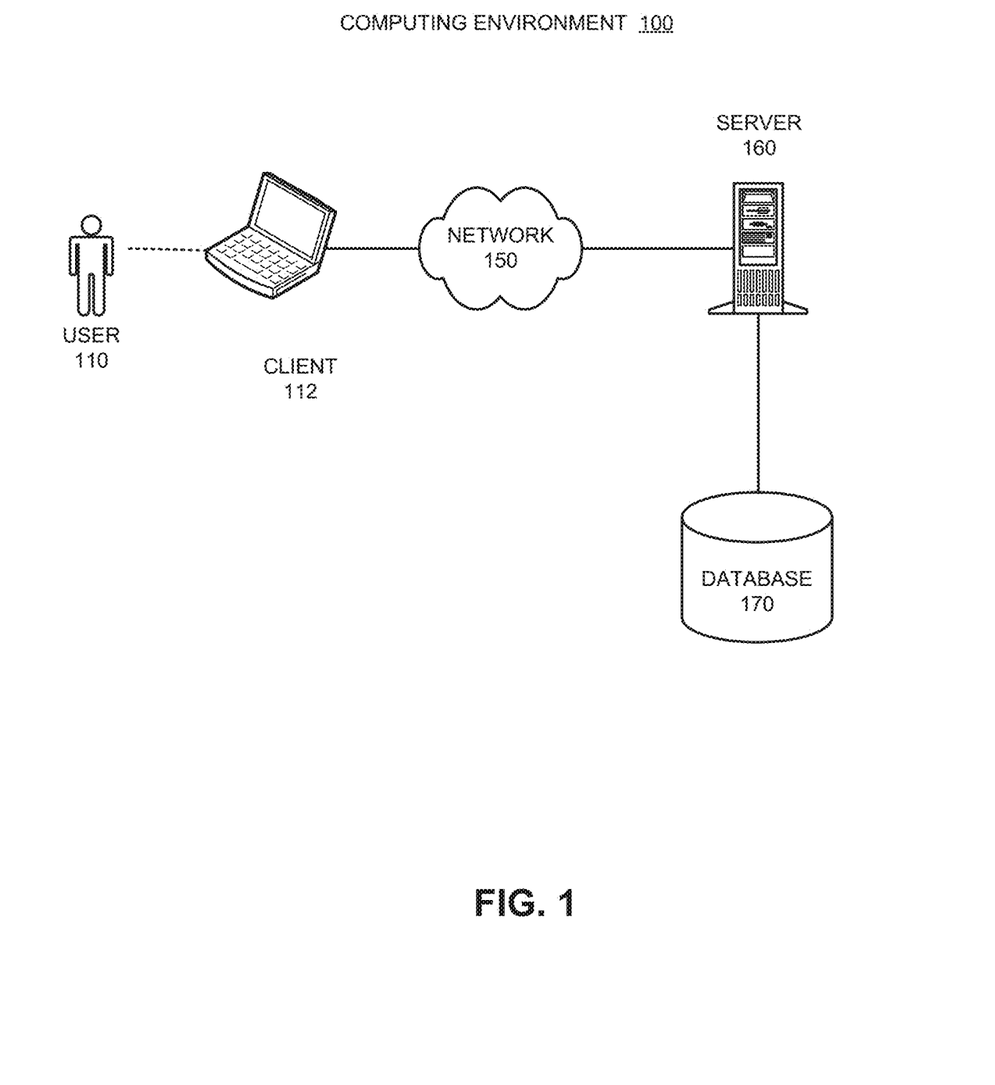
FIG. 1 illustrates a computing environment in accordance with some described embodiments.

FIG. 1 illustrates a network in accordance with some embodiments described herein. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes a user 110, client 112, network 150, server 160, and a database 170.

Client 112 can include any node on a network with computational capability and with a mechanism for communicating across the network. Additionally, client 112 may comprise a tier in an n-tier application architecture, wherein the client performs as a server (servicing requests from lower tiers or users), and/or wherein the client may perform as client (forwarding the requests to a higher tier). Furthermore, a client can include any type of electronic device. This includes, but is not limited to, cell phones, personal digital assistants (PDAs), smartphones, personal music players (such as MP3 players), gaming systems, digital cameras, video cameras, portable storage media, or any other device that can be coupled to the client.

Similarly, a server 160 can generally include any node on a network including a mechanism for servicing requests from a client for computational and/or data storage resources. A server 160 can participate in an advanced computing cluster, or can act as a stand-alone server.

User 110 can include: an individual; a group of individuals; an organization; a group of organizations; a computing system; a group of computing systems; or any other entity that can interact with computing environment 100.

Network 150 can include any type of wired or wireless communication channel capable of coupling together computing nodes. This includes, but is not limited to, a local area network, a wide area network, or a combination of networks. In some embodiments described herein, network 150 includes the Internet. In some embodiments described herein, network 150 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 160), to a client, or directly to a network.

Note that different embodiments may use different system configurations, and are not limited to the system configuration illustrated in computing environment 100. In general, any device that is capable of communicating via network 150 may include embodiments described herein.

System

Figure 2:
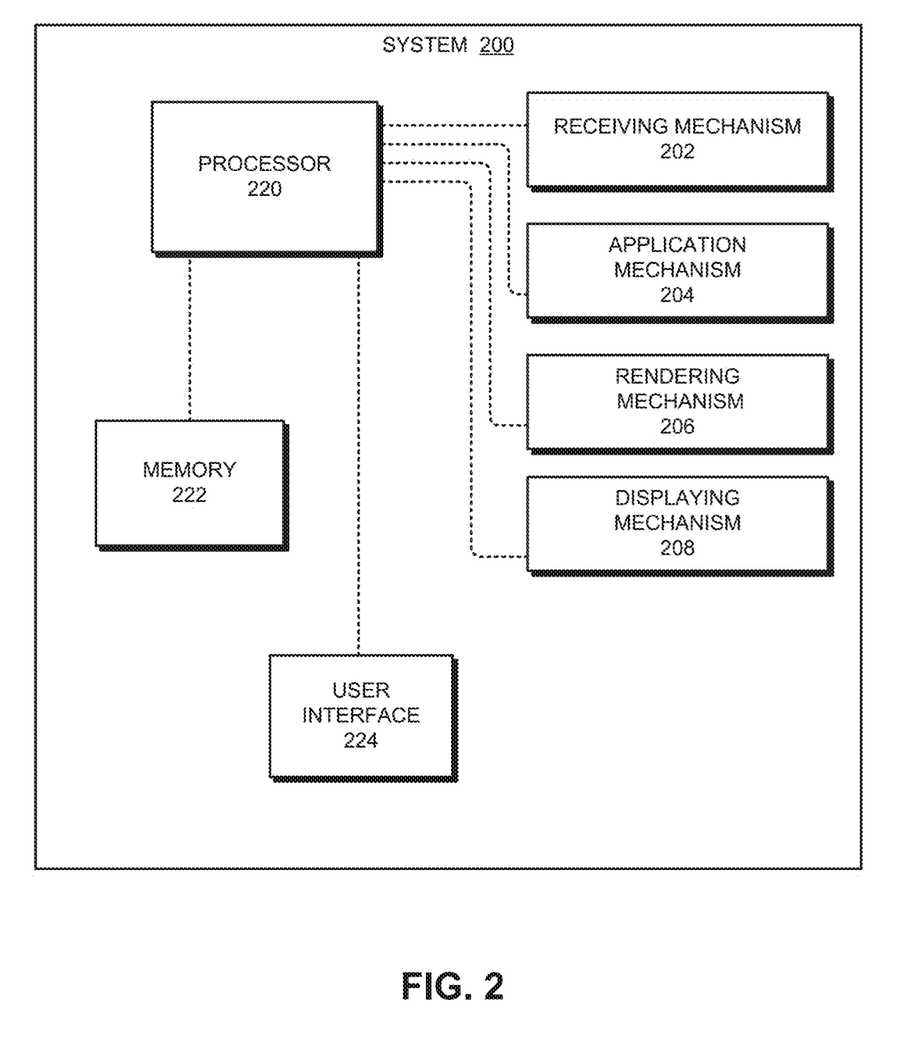
FIG. 2 illustrates a system in accordance with some described embodiments.

FIG. 2 illustrates a system 200 in accordance with some embodiments described herein. As illustrated in FIG. 2, system 200 can include processor 220, memory 222, UI 224, a receiving mechanism 202, an application mechanism 204, a rendering mechanism 206, and a displaying mechanism 208. System 200 can further comprise server 160, database 170, client 112, or any combination thereof.

Search Engine Optimization in Social Q&A Systems

Figure 3:
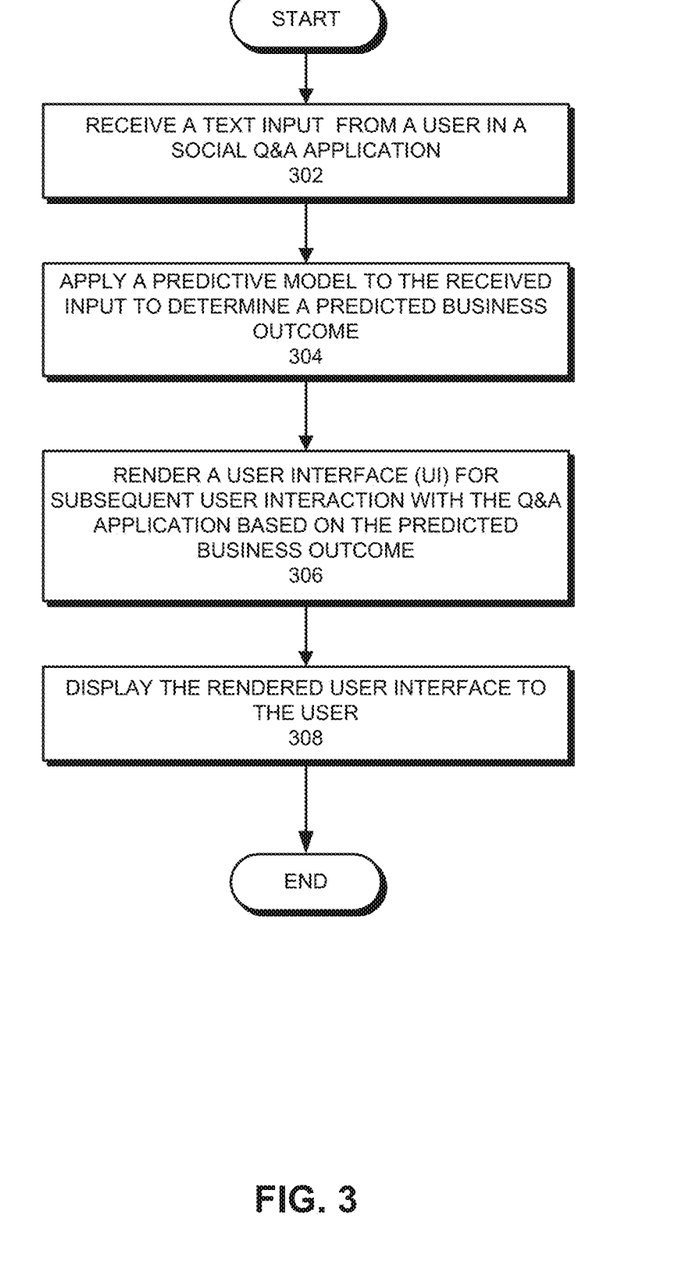
FIG. 3 presents a flowchart illustrating a technique for facilitating text inputs with long-tail keywords from a user in a social Q&A application in accordance with an embodiment.

FIG. 3 presents a flowchart illustrating the process of facilitating text inputs with long-tail keywords from a user in a social Q&A application. During operation, a receiving mechanism 202 at a system 200 receives data, such as a text input, entered by a user 110 into an entry window, from a social Q&A application running on a client device 112 (operation 302). In response, an application mechanism 204 applies a predictive model to determine a predicted business outcome for the received input (operation 304).

Next, based on the predicted business outcome, a rendering mechanism 206 renders a UI 224 for subsequent interaction by the user with the social Q&A application (operation 306). Finally, a displaying mechanism 208 displays the rendered UI to the user (operation 308).

Examples of Displayed UIs for Different User Text Inputs

Figure 4:
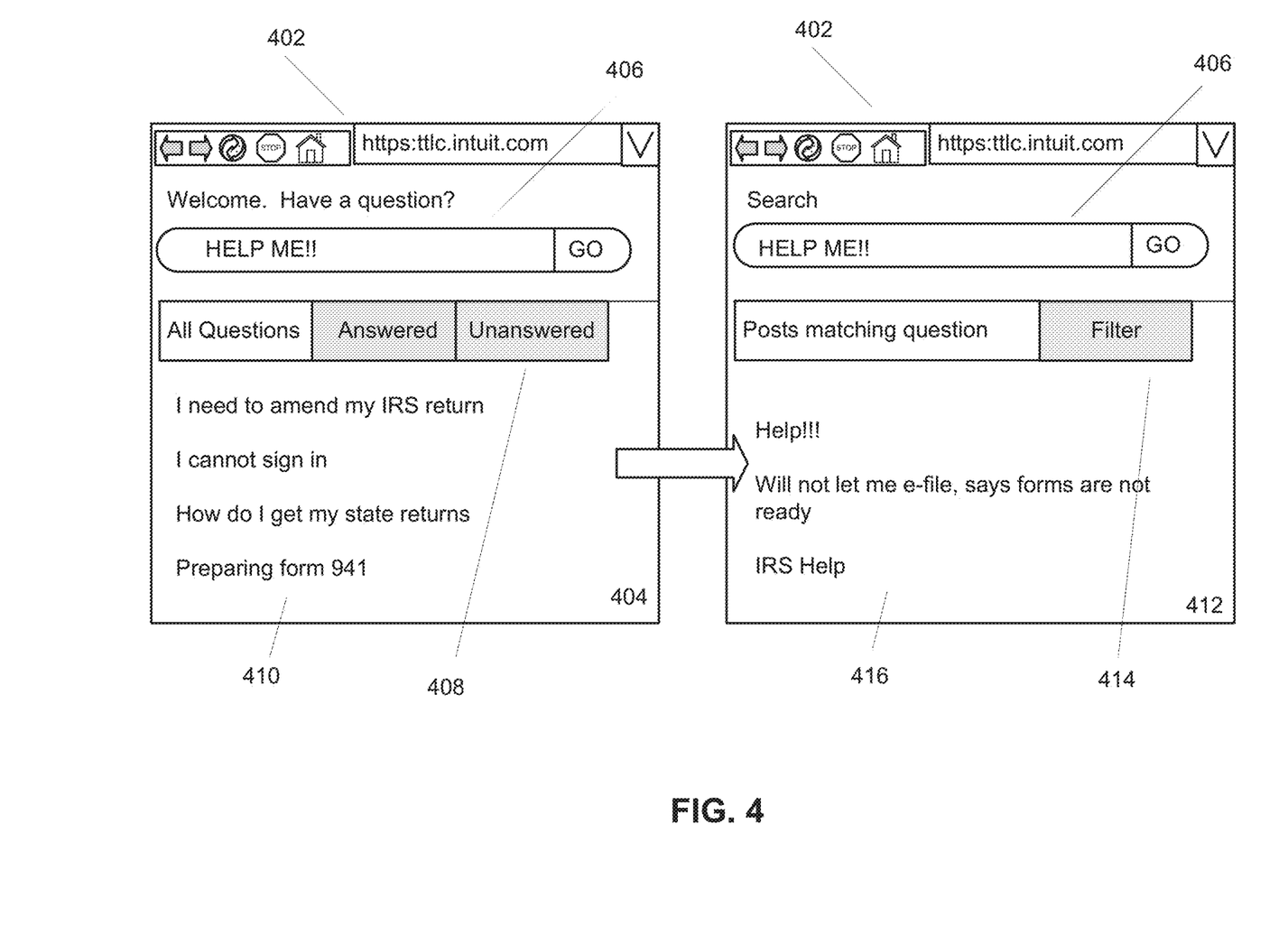
FIG. 4 presents exemplary displays of the UI in accordance with some described embodiments.

FIG. 4 shows exemplary displays of a UI 402. A user can enter text in field 406 of the UI. A set of buttons 408 enables the user to select a display of all questions in the database, or all answered questions, or all unanswered questions. The default display 404 that is presented is a generic UI with content 410 related to some or all questions that have been presented previously, either from the social Q&A community, or from the application developers to assist the user.

This default display may be presented when a user is entering a question in field 406 of the UI. In some embodiments, the displayed questions and/or answers may be prioritized by votes received from other users, date, and/or product relevance, etc.

The exemplary question shown in FIG. 4 is "HELP ME!!". Upon entry of the question in entry field 406, in some described embodiments, the system 200 determines that the predicted business outcome or value associated with the question is below a predefined threshold. Consequently, the system directs the user to a display 412 consisting of a set of instant answers 416 from the answers database that match the question in 406, and a selectable filter option 414 to facilitate further navigation through the answers in the database.

Figure 5:
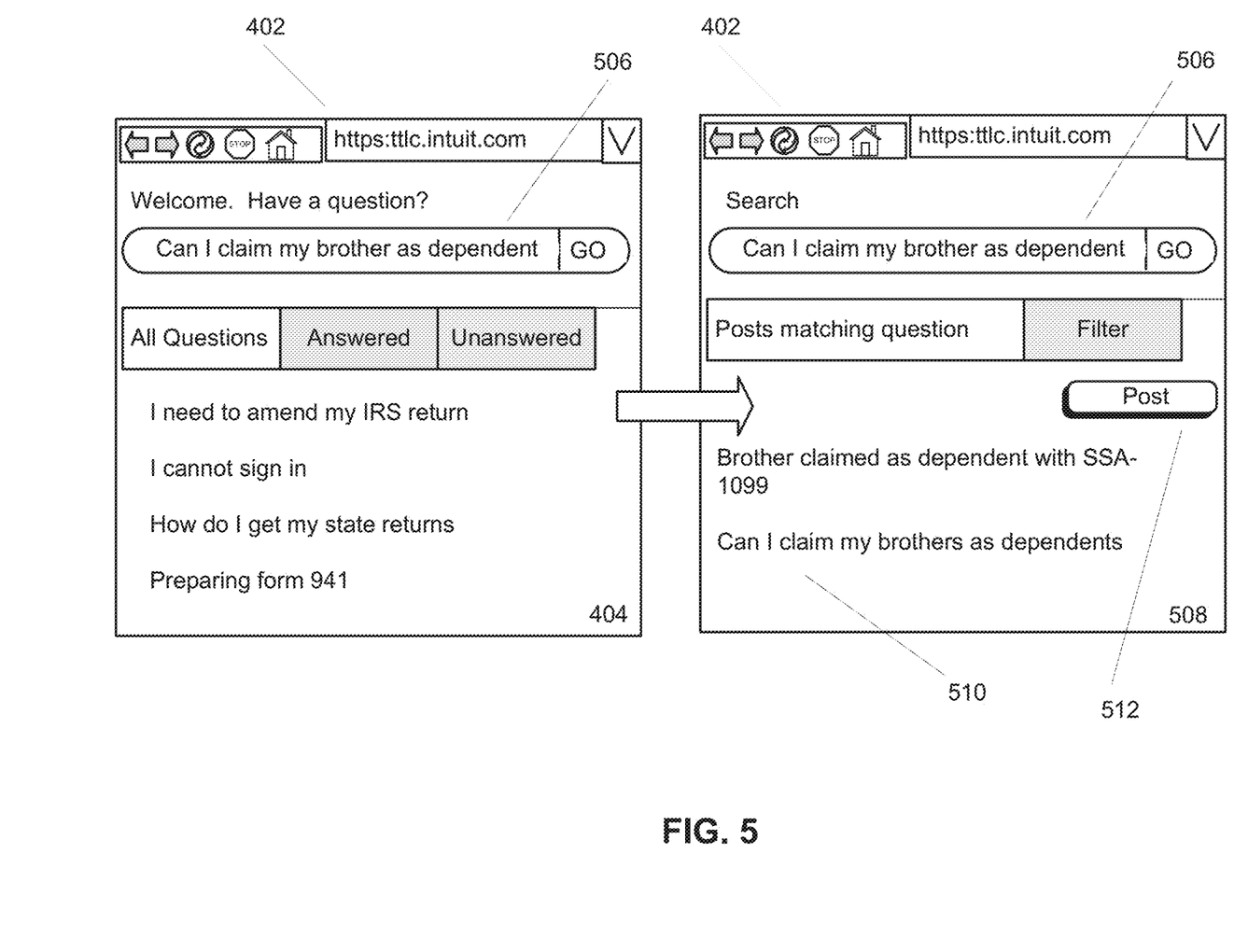
FIG. 5 presents exemplary displays of the UI in accordance with some described embodiments.

FIG. 5 shows the exemplary display of the generic UI 402. The default display 404 is presented to the user. Note that the question entered by the user has changed from the previously entered "HELP ME!!" to "Can I claim my brother as dependent?" in entry field 506.

Upon entry of this question in entry field 506, in some described embodiments, the system 200 determines that the predicted business outcome or value associated with the question is above a first predefined threshold, but below a second predefined threshold. Consequently, the system directs the user to a display 508 consisting of a set of instant answers 510 from the answers database that match the question in 506 and a selectable filter option as before, to facilitate further navigation through the answers in the database. Furthermore, the system also displays a POST button 512 that enables the user to navigate to a screen and post the question to the social Q&A community for answers from other community members.

Figure 6:
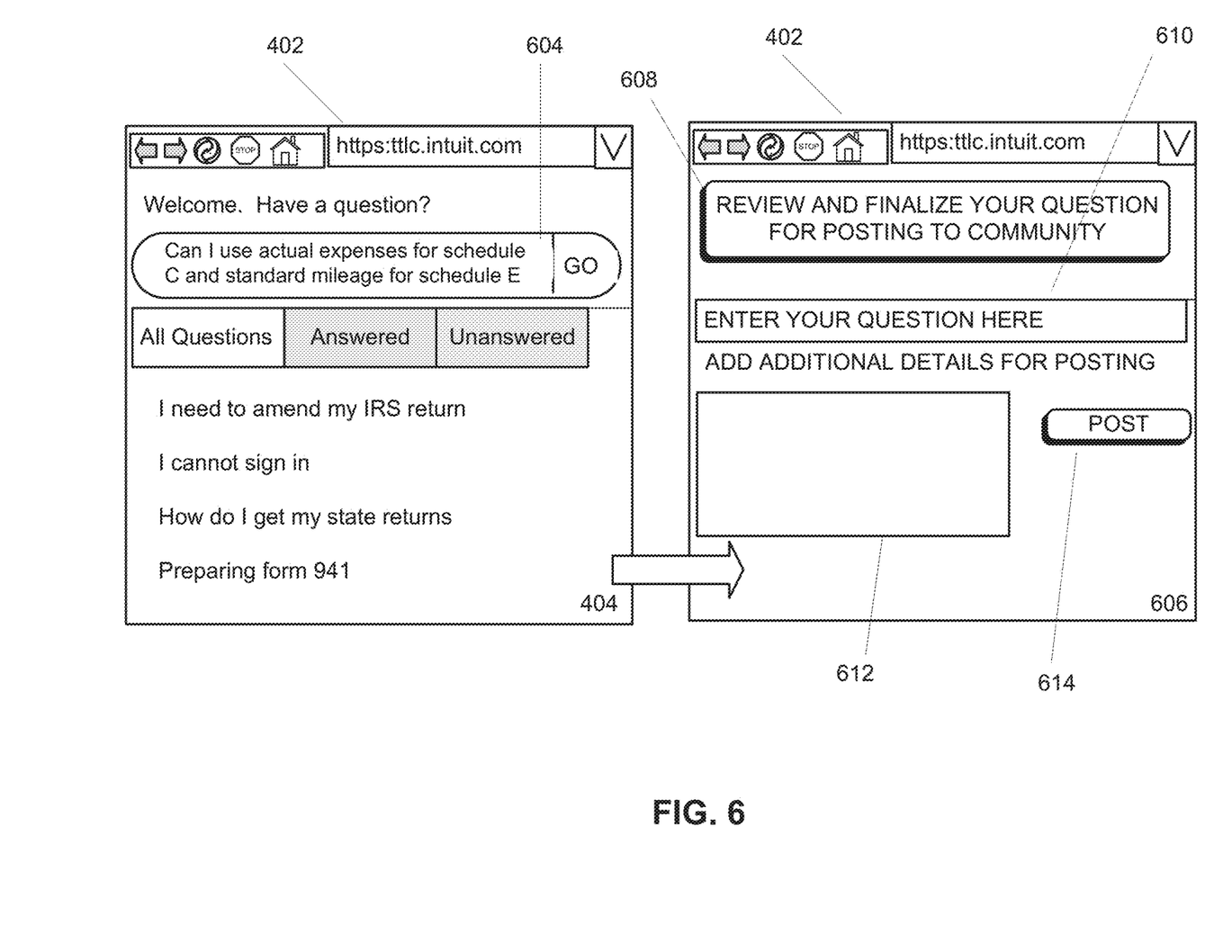
FIG. 6 presents exemplary displays of the UI in accordance with some described embodiments.

FIG. 6 shows the exemplary display of the generic UI 402. The default display 404 is presented to the user. Note that the question entered by the user has now changed to "Can I use actual expenses for schedule C and standard mileage for schedule E?" in entry field 604.

Upon entry of this question in entry field 604, in some described embodiments, the system 200 determines that the predicted business outcome or value associated with the question is above a second predefined threshold. Consequently, the system directs the user to a display 606 that enables the user to directly enter/edit and post the question to the social Q&A community for answers from other community members. The UI display provides an indication 608 to the user to review and finalize the question for posting to the community. An entry field 610 is provided for the user to enter the question. Additional entry space 612 is provided for the user to enter details associated with her question. A POST button 614 is provided for the user to post the question to the social Q&A community.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating posts with long-tail keywords from a user in a social question and answer (Q&A) application, comprising:
receiving, at a server, a text input from the user at a client computer, wherein the text input poses a query within a community, wherein the server comprises a processor and a memory;
applying a predictive model to the text input;
predicting based on the predictive model, an increase, relative to an amount of user traffic received from an external search engine referring users of the external to the community prior to receipt of the text input, in user traffic resulting from the external search engine referring users of the external search engine to the community for one or more keywords included in the text input, wherein the predictive model predicts the increase in user traffic based in part on long-tail keywords within the text input;
determining a user interface (UI) to be generated for display to the user for subsequent interaction based on the predicted increase in user traffic, wherein the UI facilitates a direct posting of the text input to the community;
sending the UI to the client computer for display at the client computer to facilitate subsequent user-interaction with the community; and
receiving a subsequent text input from the client computer to include in the direct posting of the text input.

2. The method of claim 1, wherein the UI facilitates a tailored navigation through one or more answers databases when the increase in user traffic is below a first threshold.

3. The method of claim 1, wherein the UI facilitates the direct posting of the text input when the increase in user traffic is above a second threshold.

4. The method of claim 1, further comprising: posting the subsequent text input to the community.

5. The method of claim 1, wherein applying the predictive model involves obtaining model attributes from one or more of:
content of the text input;
data associated with the user; or
data associated with a product.

6. The method of claim 5, wherein obtaining values for the model attributes from the content of the text input involves:
preprocessing the text input with a natural-language processing model; and
converting the text input into an array using a bag-of-words model, wherein the array may be based on an analysis of most frequently used keywords associated with the community.

7. The method of claim 1, wherein determining the increase in user traffic for the text input involves determining one or more of: a number of potential search engine users who will click on a search engine snippet based on the text input.

8. A server, comprising:
a processor; and
memory storing one or more applications, which, when executed on the processor performs an operation for facilitating posts with long-tail keywords from a user in a social question and answer (Q&A) application, the operation comprising:
receiving, at the server, a text input from the user at a client computer, wherein the text input poses a query within a community;
applying a predictive model to the text input;
predicting, based on the predictive model, an increase, relative to an amount of the user traffic received from an external search engine referring users of the external to the community prior to receipt of the text input, in user traffic resulting from the external search engine referring users of the external search engine to the community for one or more keywords included in the text input, wherein the predictive model predicts the increase in user traffic based in part on long-tail keywords within the text input;

determining a user interface (UI) to be generated for display to the user for subsequent interaction based on the predicted increase in user traffic, wherein the UI facilitates a direct posting of the text input to the community;

sending the UI to the client computer for display at the client computer to facilitate subsequent user-interaction with the community; and receiving a subsequent text input from the client computer to include in the direct posting of the text input.

9. The server of claim 8, wherein the UI facilitates a tailored navigation through one or more answers databases when the increase in user traffic is below a first threshold.

10. The server of claim 8, wherein the UI facilitates the direct posting of the text input when the increase in user traffic is above a second threshold.

11. The server of claim 8, wherein the operation further comprises: posting the subsequent text input is to the community.

12. The server of claim 8, wherein applying the predictive model involves obtaining model attributes from one or more of:
content of the text input;
data associated with the user; or
data associated with a product.

13. The server of claim 12, wherein obtaining values for the model attributes from the content of the text input involves:
preprocessing the text input with a natural-language processing model; and
converting the text input into an array using a bag-of-words model, wherein the array may be based on an analysis of most frequently used keywords associated with the community.

14. The server of claim 8, wherein determining the increase in user traffic for the text input involves determining a number of potential search engine users who will click on a search engine snippet based on the text input.

15. A non-transitory computer-readable storage medium containing instructions that, when executed, perform an operation for facilitating posts with long-tail keywords from a user in a social question and answer (Q&A) application, the operation comprising:

receiving, at a server, a text input from the user at a client computer, wherein the text input poses a query within a community wherein the server comprises a processor and a memory;

applying a predictive model to the text input;

predicting, based on the predictive model, an increase, relative to an amount of user traffic received from an external search engine referring users of the external to the community prior to receipt of the text input, in user traffic resulting from the external search engine referring users of the external search engine to the community for one or more keywords included in the text input, wherein the predictive model predicts the increase in user traffic based in part on long-tail keywords within the text input;

determining, by the processor, a user interface (UI) to be generated for display to the user for subsequent interaction based on the predicted increase in user traffic, wherein the UI facilitates a direct posting of the text input to the community;

sending the UI to the client computer for display at the client computer to facilitate subsequent user-interaction with the community; and receiving a subsequent text input from the client computer to include in the direct posting of the text input.

16. The computer-readable storage medium of claim 15, wherein the UI facilitates a tailored navigation through one or more answers databases when the increase in user traffic is below a first threshold.

17. The computer-readable storage medium of claim 15, wherein the UI facilitates the direct posting of the text input when the increase in user traffic is above a second threshold.

18. The computer-readable storage medium of claim 15, wherein applying the predictive model involves obtaining model attributes from one or more of:
content of the text input;
data associated with the user; or
data associated with a product.

19. The computer-readable storage medium of claim 18, wherein obtaining values for the model attributes from the content of the text input involves:
preprocessing the text input with a natural-language processing model; and
converting the text input into an array using a bag-of-words model, wherein the array may be based on an analysis of most frequently used keywords associated with the community.

20. The computer-readable storage medium of claim 15, wherein determining the increase in user traffic for the text input involves determining a number of potential search engine users who will click on a search engine snippet based on the text input.

* * * * *